United States Patent [19]

Miyoshi et al.

[11] 4,288,579
[45] Sep. 8, 1981

[54] PROCESS FOR PREPARING POLYOLEFINS

[75] Inventors: Mitsuji Miyoshi, Kanagawa; Yoshio Tajima, Tokyo; Kazuo Matsuura, Kawasaki; Nobuyuki Kuroda, Yokohama; Mitsuo Matsuno, Kawasaki, all of Japan

[73] Assignee: Nippon Oil Company, Limited, Tokyo, Japan

[21] Appl. No.: 102,646

[22] Filed: Dec. 12, 1979

Related U.S. Application Data

[63] Continuation-in-part of Ser. No. 27,929, Apr. 6, 1979, abandoned.

[30] Foreign Application Priority Data

Apr. 11, 1978 [JP] Japan .................. 53/41715

[51] Int. Cl.$^3$ .................. C08F 4/02; C08F 10/06
[52] U.S. Cl. .................. 526/124; 252/429 B; 526/125; 526/351; 526/906
[58] Field of Search .................. 526/124, 27, 929

[56] References Cited

U.S. PATENT DOCUMENTS

| 3,400,110 | 9/1968 | Dassesse et al. | 526/125 |
| 3,658,722 | 4/1972 | Delbouille et al. | 526/125 |
| 3,819,599 | 6/1974 | Fotis et al. | 526/124 |
| 3,888,789 | 6/1975 | Dombro et al. | 526/125 |
| 4,103,078 | 7/1978 | Sato et al. | 526/124 |
| 4,107,414 | 8/1978 | Giannini et al. | 526/125 |
| 4,144,390 | 3/1979 | Derroitte et al. | 526/125 |

FOREIGN PATENT DOCUMENTS

| 2826547 | 1/1979 | Fed. Rep. of Germany | 526/124 |
| 5044273 | 4/1975 | Japan | 526/125 |
| 1128724 | 10/1968 | United Kingdom | 526/142 |

Primary Examiner—Edward J. Smith
Attorney, Agent, or Firm—Wyatt, Gerber, Shoup, Scobey & Badie

[57] ABSTRACT

According to this invention there is provided a process for polymerizing or copolymerizing olefins using a catalyst consisting of:

[A] a solid component obtained by contacting
(1) a reaction product resulting from heat reaction of a magnesium oxide and an aluminum trihalide with
(2) a titanium halide and/or an addition product of a titanium halide and an aromatic carboxylic acid ester, and

[B] an organometallic compound and/or an addition product of an organometallic compound and an aromatic carboxylic acid ester, or alternatively, using a catalyst consisting of acid components [A] and [B] plus [C] an aromatic carboxylic acid ester.

11 Claims, No Drawings

PROCESS FOR PREPARING POLYOLEFINS

CROSS REFERENCE TO RELATED APPLICATION

This application is a continuation-in-part application of our prior filed application Ser. No. 27,929 filed Apr. 6, 1979 now abandoned.

BACKGROUND OF THE INVENTION

1. Field of the Invention

This invention relates to the polymerization or copolymerization of olefins using a new catalyst. More particularly, it is concerned with a process for preparing polyolefins characterized by polymerizing or copolymerizing α-olefins in high stereo-regularity using a new catalyst with high-performance carrier.

2. Description of the Prior Art

As a high stereoregular polymerization catalyst for α-olefins there has heretofore been known a catalyst consisting of a titanium halide and an organoaluminum compound. In the polymerization using such known catalyst system, however, the yield per titanium component is still insufficient though a high stereoregular polymer is obtained, and in recent years to eliminate the need for removal of residual catalyst in the resulting polymer there have been proposed some high-performance catalysts with magnesium halide as carrier (see Japanese Patent Public Disclosure Nos. 16986/73, 16987/73 and 16988/73).

SUMMARY OF THE INVENTION

This invention relates to a process for preparing highly stereoregular polyolefins in extremely high yield using a new catalyst system. According to the process of this invention, the partial pressure of monomer during polymerization is low and a short time polymerization leaves only a very small amount of catalyst in the resulting polymer, so that the catalyst removing step in the polyolefin production process can be omitted; in addition, the amount of atactic part produced in the resulting polymer is very small. Thanks to these advantages, this invention provides a very economical process for preparing polyolefins.

More particularly, this invention is concerned with a process for polymerizing or copolymerizing olefins using a catalyst consisting of [A] a solid component obtained by contacting (1) a reaction product resulting from heat reaction of a magnesium oxide and an aluminum trihalide with (2) a titanium halide and/or an addition product of a titanium halide and an aromatic carboxylic acid ester, and [B] an organometallic compound and/or an addition product of an organometallic compound and an aromatic carboxylic acid ester, or alternatively using a catalyst consisting of the said components [A] and [B] plus [C] an aromatic carboxylic ester. It is surprising and entirely beyond anticipation that highly stereoregular polyolefins could be produced in high activity using the quite new catalyst system of the present invention.

DESCRIPTION OF THE INVENTION

This invention is described below more in detail.

The reaction ratio of magnesium oxide and aluminum trihalide, e.g. aluminum trichloride, used in this invention is in the range of from 0.3 to 5, preferably from 0.5 to 2 and more preferably from 0.6 to 1.5 in terms of Al/Mg atomic ratio. Conditions for reaction of both components are the conditions for a burning reaction of both, involving reaction temperatures ranging from 150° to 600° C., preferably from 200° to 500° C. and most preferably from 250° to 400° C., and reaction times which are not specially limited, but usually in the range of from 1 minute to 10 hours. The method of burning reaction is not specially limited, but it is convenient to conduct the reaction in solid phase. The kind of magnesium oxide to be used is not specially limited, either, but those containing as less number of hydroxyl group as possible are desirable.

The solid carrier prepared as above is contacted, in the prsence or absence of an aromatic carboxylic acid ester, with the component (2), namely a titanium halide and/or an addition product of a titanium halide and an aromatic carboxylic acid ester, whereby a solid catalyst component can be prepared.

The aromatic carboxylic acid ester if it is to be present in the above-mentioned preparation of a solid catalyst component and the aromatic carboxylic acid ester used as an addition product in the component (2) may be the same or different, or two or more may be used in combination.

Aromatic carboxylic acid esters which may be used in the present invention are those compounds containing at least one carboxylic acid ester group directly attached to a mono- or polyaromatic ring. The aromatic ring may contain other substituent groups, such as alkyl, aryl and halogen, unless they have bad influence upon the reaction. The following are typical of such esters.

Alkyl benzoate such as methyl benzoate, ethyl benzoate, n-propyl benzoate, dipropyl benzoate, butyl benzoate, and hexyl benzoate; cycloalkyl benzoate such as cyclopentyl benzoate and cyclohexyl benzoate; aryl benzoate such as phenyl benzoate and bezoic acid-4-tolyl; hydroxybenzoic acid esters such as methyl salicylate, ethyl salicylate, methyl p-hydroxybenzoate, ethyl p-hydroxybenzoate, phenyl salicylate, cyclohexyl p-hydroxybenzoate, benzyl salicylate, and ethyl α-resorcinate; alkoxybenzoic acid esters such as methyl anisate, ethyl anisate, phenyl anisate, benzyl anisate, ethyl o-methoxybenzoate, and methyl p-ethoxybenzoate; alkylbenzoic acid esters such as methyl p-toluylate, ethyl p-toluylate, phenyl p-toluylate, ethyl o-toluylate, and ethyl m-toluylate; amino group-containing benzoic acid esters such as methyl p-aminobenzoate and ethyl p-aminobenzoate; other benzoic acid esters such as vinyl benzoate, allyl benzoate, and benzyl benzoate; and naphthoic acid esters such as methyl naphthoate and ethyl naphthoate.

Specially preferred among these compounds are alkyl esters of benzoic acid, o- or p-toluic acid or p-anisic acid; and methyl and ethyl esters thereof are specially desirable.

If an aromatic carboxylic acid is added when contacting the solid carrier of the component (1) with a titanium halide and/or an addition product of a titanium halide and an aromatic carboxylic acid ester of the component (2), its amount is usually not larger than 5 mols and preferably not larger than 1 mol per mol of the solid carrier (based on Mg atom).

To prepare the solid catalyst component, known methods may be used. For example, (1) the reaction product resulting from heat reaction of a magnesium oxide and an aluminum trihalide and (2) a titanium halide and/or an addition product of a titanium halide and an aromatic carboxylic acid ester may be reacted together in the absence of solvent or in an inert solvent and in the presence or absence of an aromatic carboxylic acid ester. Examples of such inert solvent are hydrocarbon solvents, e.g. hexane and heptane, and the reaction may be conducted usually at a temperature ranging from 0° to 150° C. and for a period of time ranging from 1 minute to 24 hours. Such a liquid titanium compound as titanium tetrachloride may be used in the absence of solvent in the reaction. After completion of the reaction, the product may be used as it is or a solid catalyst component may be separated, washed with an inert solvent and then used for the polymerization (such a method of contacting under solution will hereinafter be referred to as the "solution method").

Also, such solid catalyst component may be prepared by pulverizing all its components together in the presence or absence of an aromatic carboxylic acid ester, or by first pulverizing part of its components together then contacting the other component by the solution method, or by first contacting part of its components by the solution method then adding the other component followed by co-pulverization.

The apparatus to be used for such co-pulyerization is not specially limited, but usually employed are ball mill, vibration mill, rod mill, and impact mill. Pulverization conditions such as pulverization temperature and time can be determined easily by those skilled in the art according to the method of pulverization. Generally, the pulverization temperature may be in the range of from about 0° to 50° C. and the pulverization time from 0.5 to 50 hours, preferably from 1 to 30 hours.

The amount of a titanium halide to be supported is preferably adjusted so that the amount of titanium contained in the resulting solid is in the range of from 0.5 to 20% by weight, and the range of from 1 to 8% by weight is specially desirable in order to obtain a well-balanced activity per titanium and per solid.

Titanium halides used as component (2) in this invention are not specially limited. Preferable tetravalent titanium halides are the compounds represented by the general formula $Ti(OR)_nX_{4-n}$ wherein R is an alkyl, aryl or aralkyl group having 1 to 20 carbon atoms, preferably 1 to 8 carbon atoms, X is halogen atom and n is a whole number of from 0 to 3. Examples of the tetravalent halides are titanium tetrachloride, titanium tetrabromide, titanium tetraiodide, monoethoxytrichlorotitanium, diethoxydichlorotitanium, triethoxymonochlorotitanium, monoisopropoxytrichlorotitanium, diisopropoxydichlorotitanium, reaction product of silicon tetrachloride and titanium alkoxide, and mixtures thereof.

Examples of trivalent titanium halides used in this invention, which are not specially limited, are various titanium trihalides obtained by reducing titanium tetrahalides with hydrogen, aluminum titanium or organometallic compounds, and compounds obtained by reducing various tetravalent alkoxytitanium halides with organometallic compounds.

Specially preferable in this invention are tetravalent titanium halides.

Addition products of titanium halides and aromatic carboxylic acid esters, which may be used in this invention, indicate addition compounds of the foregoing titanium halides and the foregoing various aromatic carboxylic acid esters, and those having a molar ratio of aromatic carboxylic acid ester to titanium halide of either 1:1 or 1:2 are preferred. Addition products of titanium halides and aromatic carboxylic acid esters can be obtained easily by mixing the two at a temperature in the range of from 0° to 100° C., preferably from 20° to 80° C., in the presence or absence of an inert solvent, it being preferable that the mixing ratio be 1 to 2 mols of aromatic carboxylic acid ester per mol of titanium halide. Examples of such addition products are $TiCl_4 \cdot C_6H_5COOC_2H_5$, $TiCl_4 \cdot 2C_6H_5COOC_2H_5$, $TiCl_4 \cdot p\text{-}CH_3OC_6H_5COOC_2H_5$, and $TiCl_3 \cdot C_6H_5COOC_2H_5$.

A mixture of a titanium halide and an addition product of a titanium halide and an aromatic carboxylic acid ester may also be used preferably.

Organometallic compounds which may be used in this invention are those of Group I-IV metals in the Periodic Table which are known as a component of Ziegler catalyst. Specially, organoaluminum compounds and organozinc compounds are preferred, for example organoaluminum compounds represented by the general formulae $R_3Al$, $R_2AlX$, $RAlX_2$, $R_2AlOR$, $RAl(OR)X$, and $R_3Al_2X_3$ wherein R is alkyl or aryl having 1 to 20 carbon atoms and may be the same or different, and X is halogen, and organozinc compounds represented by the general formula $R_2Zn$ wherein R is alkyl having 1 to 20 carbon atoms and both Rs may be the same or different, such as triethylaluminum, triisobutylaluminum, trihexylaluminum, trioctylaluminum, diethylaluminum chloride, ethylaluminum sesquichloride, diethylzinc, and mixtures thereof.

Addition products of organometallic compounds and aromatic carboxylic acid esters, which may be used in this invention, are those of the foregoing organometallic compounds and the foregoing various aromatic carboxylic acid esters, and those having a molar ratio of aromatic carboxylic acid ester to organometallic compound of 1:2 to 2:1 are adopted preferably.

Addition products of organometallic compounds and aromatic carboxylic acid esters can be obtained easily by a known method, that is, by mixing the two at a temperature in the range of from 0° to 100° C., preferably from 20° to 80° C., in the presence or absence of an inert solvent, it being preferable that the mixing ratio be 0.5 to 1 mol of aromatic carboxylic acid ester per mol of organometallic compound.

A mixture of an organometallic compound and an addition product of an organometallic compound and an aromatic carboxylic acid ester may also be used preferably. The organometallic compounds here used may be same or different.

The amount of organometallic compounds used in this invention is not specially limited, but usually employable is 0.1 to 1000 mols per mol of titanium halide.

This invention is also concerned with a process for polymerizing or copolymerizing olefins using a catalyst consisting of [A] a solid component obtained by contacting (1) a reaction product resulting from heat reaction of a magnesium oxide and an aluminum trihalide with (2) a titanium halide and/or an addition product of a titanium halide and an aromatic carboxylic acid ester, and [B] an organometallic compound and/or an addition product of an organometallic compound and an aromatic carboxylic acid ester, and further [C] an aromatic carboxylic acid ester. In this case, the amount of the aromatic carboxylic acid ester of component [C] may be chosen so that the total amount of aromatic carboxylic acid ester presence in the [A], [B] and [C] organometallic compound molar ratio is not higher than 1.5, for example in the range of from 0.05 to 1.5 and preferably from 0.1 to 0.7.

The aromatic carboxylic acid esters used in the components [A], [B] and [C] may be the same or different.

In both cases of using the components [A] and [B] as catalyst and using the components [A], [B] and [C] as catalyst, it is desirable that the total amount of aromatic carboxylic acid ester(s) be not smaller than 0.05 mol, preferably in the range of from 0.05 to 10 mols and most preferably from 0.2 to 10 mols, based on the amount of magnesium (gram-atom) contained in the catalyst system.

The olefin polymerization reaction using the catalyst of this invention is carried out in the same manner as the ordinary olefin polymerization reaction using a Ziegler catalyst; that is, the reaction is conducted in vapor phase in substantially oxygen- or water-free condition and in the presence of an inert solvent or using monomer itself as solvent. The polymerization conditions for olefin involve temperatures ranging from 20° to 300° C., preferably from 40° to 180° C., and pressures ranging from atomspheric to 70 kg/cm$^2$.G, preferably from 2 to 60 kg/cm$^2$.G. The molecular weight can be changed to some extent by changing the polymerization conditions, e.g. the polymerization temperature and the molar ratio of catalyst, but it is adjusted more effectively by adding hydrogen into the polymerization system. Using the catalyst of this invention, two or more stage polymerization reactions involving different polymerization conditions, e.g. different hydrogen concentrations and polymerization temperatures, may be carried out without any trouble.

The process of this invention is applicable to the polymerization of all olefins that are polymerizable with Ziegler catalysts. For example, it is conveniently applicable to the homopolymerization of α-olefins such as ethylene, propylene, 1-butene, and 4-methylpentene, and also to the random and block copolymerizations of ethylene and propylene, ethylene and 1-butene, propylene and 1-butene. Furthermore, copolymerization with dienes for the modification of polyolefins, e.g. ethylene and butadiene, ethylene and 1,4-hexadiene, is also carried out preferably by the process of this invention.

The process of this invention is effective for polymerizing or copolymerizing in high stereoregularity specially α-olefins of $C_3$ to $C_8$.

DESCRIPTION OF PREFERRED EMBODIMENTS

Examples of this invention are given below, but it is to be understood that these examples are for illustration only to work the invention and this invention is not limited thereto.

EXAMPLE 1

(a) Solid Component Preparation 40 g. of magnesium oxide and 133 g. of aluminum trichloride were heat-reacted at 300° C. for 4 hours, then 9.5 g. of the reaction product and 1.7 g. of titanium tetrachloride were placed in a stainless steel pot having an content volume of 400 ml and containing 25 stainless steel balls each ½ inch in diameter, and a ball milling was made for 16 hours at room temperature in nitrogen atmosphere. 39 mg of titanium was contained per gram of the resulting powdered solid.

(b) Polymerization

A 2 liter stainless steel autoclave equipped with an induction stirrer was purged with nitrogen and 1000 ml of hexane was placed therein, then 2 millimols of triethyl-aluminum, 0.56 millimol of ethyl benzoate and 80 mg of the above powdered solid were added and the temperature was raised to 50° C. under stirring. The system was pressurized at 0.5 kg/cm$^2$.G with the vapor pressure of hexane and further pressurized to the total pressure of 7 kg/cm$^2$.G with propylene while polymerization was started. The polymerization was carried out for 1 hour while propylene was continuously introduced to maintain to total pressure at 7 kg/cm$^2$.G.

After completion of the polymerization, excess propylene was discharged, followed by cooling, then the contents were taken out and dried to yield 85 g. of white polypropylene, which was the total amount of product including amorphous substance.

Catalyst activity was 163 g.polypropylene/g.solid.hr.$C_3H_6$ pressure, 4180 g.polypropylene/g.Ti.hr.$C_3H_6$ pressure. The extraction residue with boiling n-heptane for the total polymer including solvent-soluble polymer was 74.5%.

COMPARATIVE EXAMPLE 1

A solid component was prepared in the same manner as in Example 1 except that aluminum trichloride was not used, and polymerization was carried out for 1 hour in the same way as in Example 1. As a result, only a trace amount of polymer was obtained and thus the catalyst activity was very low.

COMPARATIVE EXAMPLE 2

A solid component was prepared in the same manner as in Example 1 except that magnesium oxide and aluminum trichloride were not heat-reacted but pulverized together, and polymerization was carried out for 1 hour in the same way as in Example 1. As a result, only a trace amount of polymer was obtained and thus the catalyst activity was very low.

EXAMPLE 2

Polymerization was conducted in the same way as in Example 1 except that 0.56 millimol of ethyl p-anisate was used in place of ethyl benzoate, to yield 83 g. of white polypropylene. Catalyst activity was 160 g.polypropylene/g.solid.hr.$C_3H_6$ pressure, 4100 g.polypropylene/g.Ti.hr.$C_3H_6$ pressure. The extraction residue with boiling n-heptane for the total polymer including solvent-soluble polymer was 76.0%.

EXAMPLE 3

A solid component was prepared in the same manner as in Example 1 except that there was used a reaction product resulting from heat reaction of 40 g. magnesium oxide and 266 g. aluminum trichloride at 300° C. for 4 hours. As a result, 41 mg of titanium was contained per gram of the powdered solid thereby obtained.

Using 80 mg of the above powdered solid, polymerization was conducted for 1 hour in the same manner as in Example 1 to yield 111 g. of white polypropylene. Catalyst activity was 213 g. polypropylene/g.solid.hr.$C_3H_6$ pressure, 5200 g.polypropylene/g.Ti.hr.$C_3H_6$ pressure. The extraction residue with boiling n-heptane for the total polymer including solvent-soluble polymer was 70.1%.

EXAMPLE 4

(a) Solid Component Preparation 40 g. of magnesium oxide and 133 g. of aluminum trichloride were heat-reacted at 300° C. for 4 hours, then 8.3 g. of the reaction product, 1.7 g. of titanium tetrachloride and 1.2 g. ethyl benzoate were placed in a stainless steel pot having a content volume of 400 ml and containing 25 stainless steel balls each ½ inch in diameter, and a ball milling was made for 16 hours at room temperature in nitrogen atmosphere. 40 mg of titanium was contained per gram of the resulting powdered solid.

(b) Polymerization

A 2 liter stainless steel autoclave equipped with an induction stirrer was purged with nitrogen and 100 ml of hexane was placed therein, then 2 millimols of triethylaluminum, 0.56 millimol of ethyl benzoate and 60 mg of the above powdered solid were added and the temperature was raised to 50° C. under stirring. The system was pressurized at 0.5 kg/cm$^2$.G with the vapor pressure of hexane and further pressurized to the total pressure of 7 kg/cm$^2$.G with propylene while polymerization was started. The polymerization was carried out for 1 hour while propylene was continuously introduced to maintain the total pressure at 7 kg/cm$^2$.G.

After completion of the polymerization, excess propylene was discharged, followed by cooling, then the contents were taken out and dried to yield 63 g. of white polypropylene, which was the total amount of product including amorphous substance.

Catalyst activity was 160 g.polypropylene/g.solid.hr.C$_3$H$_6$ pressure, 4040 g.polypropylene/g.Ti.hr.C$_3$H$_6$ pressure. The extraction residue with boiling n-heptane for the total polymer including solvent-soluble polymer was 85.1%.

EXAMPLE 5

(a) Solid Component Preparation 40 g. of magnesium oxide and 133 g. of aluminum trichloride were heat-reacted at 300° C. for 4 hours, then 9.5 g. of the reaction product and 3.7 g. of an addition product of titanium tetrachloride and ethyl benzoate in a molar ratio of 1:1 were placed in a stainless steel pot having a content volume of 400 ml and containing 25 stainless steel balls each ½ inch in diameter, and a ball milling was made for 16 hours at room temperature in nitrogen atmosphere. 39 mg of titanium was contained per gram of the resulting powdered solid.

(b) Polymerization

A 2 liter stainless steel autoclave equipped with an induction stirrer was purged with nitrogen and 1000 ml of hexane was placed therein, then 2 millimols of triethylaluminum, 0.56 millimol of ethyl benzoate and 80 mg of the above powdered solid were added and the temperature was raised to 50° C. under stirring. The system was pressurized at 0.5 kg/cm$^2$.G with the vapor pressure of hexane and further pressurized to the total pressure of 7 kg/cm$^2$.G with propylene while polymerization was started. The polymerization was continued for 1 hour while propylene was continuously introduced to maintain the total pressure at 7 kg/cm$^2$.G.

After completion of the polymerization, excess propylene was discharged, followed by cooling, then the contents were taken out and dried to yield 75 g. of white polypropylene, which was the total amount of product including amorphous substance.

Catalyst activity was 144 g.polypropylene/g.solid.hr.C$_3$H$_6$ pressure, 3690 g.polypropylene/g.Ti.hr.C$_3$H$_6$ pressure. The extraction residue with boiling n-heptane for the total polymer including solvent-soluble polymer was 87.0%.

EXAMPLE 6

Using 80 mg of the powdered solid prepared in Example 1, 1000 ml of n-hexane, 1 millimol of an addition product of 1 mol triethylaluminum and 0.5 mol ethyl benzoate, and 1 millimol of triethylaluminum, there was conducted polymerization of propylene for 1 hour at 50° C. and at a total pressure of 7 kg/cm$^2$.G to yield 94 g. of white polypropylene. Catalyst activity was 180 g.polypropylene/g.solid.hr.C$_3$H$_6$ pressure, 4620 g.polypropylene/g.Ti.hr.C$_3$H$_6$ pressure. The extraction residue with boiling n-heptane for the total polymer including solvent-soluble polymer was 73.0%.

EXAMPLE 7

Using 80 mg of the powdered solid prepared in Example 1, 1000 ml of n-hexane, 1 millimol of an addition product of 1 mol triethylaluminum and 1 mol ethyl benzoate, and 1.5 millimol of diethylaluminumchloride, there was conducted polymerization of propylene for 1 hour at 50° C. and at a total pressure of 7 kg/cm$^2$.G to yield 125 g. of white polypropylene. Catalyst activity was 240 g.polypropylene/g.solid.hr.C$_3$H$_6$ pressure, 6000 g.polypropylene/g.Ti.hr.C$_3$H$_6$ pressure. The extraction residue with boiling n-heptane for the total polymer including solvent-soluble polymer was 71.5%.

EXAMPLE 8

(a) Solid Component Preparation 40 g. of magnesium oxide and 133 g. of aluminum trichloride were heat-reacted at 300° C. for 4 hours, then 9.5 g. of the reaction product and 3.7 g. of an addition product of titanium tetrachloride and ethyl benzoate in a molar ratio of 1:1 were placed in a stainless steel pot having a content volume of 400 ml and containing 25 stainless steel balls each ½ inch in diameter, and a ball milling was made for 16 hours at room temperature in nitrogen atmosphere. 10 g. of the copulverized matter thereby obtained was suspended in 100 ml of titanium tetrachloride. After stirring for 2 hours at 80° C., the solid component was collected by filtration and washed with hexane until there was no appreciable free titanium tetrachloride, and then dried. 60 mg of titanium was contained per gram of the resulting powdered solid.

(b) Polymerization

A 2 liter stainless steel autoclave equipped with an induction stirrer was purged with nitrogen and 1000 ml of hexane was placed therein, then 2 millimols of triethylaluminum, 0.56 millimol of ethyl benzoate and 50 mg of the above powdered solid were added and the temperature was raised to 50° C. under stirring. The system was pressurized at 0.5 kg/cm$^2$.G with the vapor pressure of hexane and further pressurized to the total pressure of 7 kg/cm$^2$.G with propylene while polymerization was started. The polymerization was carried out for 1 hour while propylene was continuously introduced to maintain the total pressure at 7 kg/cm$^2$.G.

After completion of the polymerization, excess propylene was discharged, followed by cooling, then the contents were taken out and dried to yield 86 g. of white polypropylene, which was the total amount of product including amorphous substance. Catalyst activity was 264 g.polypropylene/g.solid.hr.C$_3$H$_6$ pressure, 4400 g.polypropylene/g.Ti.hr.C$_3$H$_6$ pressure. The extraction residue with boiling n-heptane for the total polymer including solvent-soluble polymer was 82%.

COMPARATIVE EXAMPLE 3

(a) Solid Component Preparation

Magnesium oxide was halogenated with a gaseous hydrogen chloride at 150° C. for 2 hours. The chlorine content of the resulting solid was 19.0 wt.%. Then, 11 g. of this solid and 1.7 g. of titanium tetrachloride were placed in a stainless steel pot having a content volume of 400 ml and containing 25 stainless steel balls each ½ inch in diameter, and a ball milling was made for 16 hours at room temperature in nitrogen atmosphere. 39 mg of titanium was contained per gram of the resulting powdered solid.

(b) Polymerization

Using 80 mg of the above powdered solid, polymerization was conducted for 1 hour in the same manner as in Example 1 to yield 9.6 g. of white polypropylene. Catalyst activity was 18.5 g.polypropylene/g.solid.hr.$C_3H_6$ pressure, 460 g.polypropylene/g.Ti.hr.$C_3H_6$ pressure. The extraction residue with boiling n-heptane for the total polymer including solvent-soluble polymer was 70.5%.

Thus, when magnesium oxide was treated with such a halogenating agent as hydrogen chloride, the catalyst activity was much lower than that in Example 1.

COMPARATIVE EXAMPLE 4

(a) Solid Component Preparation 10 g. of magnesium oxide was suspended in 100 ml of n-heptane and 19.8 g. of thionyl chloride was added, then reaction was allowed to take place for 2 hours under reflux of n-heptane. Thereafter, unreacted thionyl chloride and n-heptane were distilled off leaving a solid containing 20.5 wt.% of chlorine. Then, 9.5 g. of this solid and 1.7 g. of titanium tetrachloride were placed in a stainless steel pot having a content volume of 400 ml and containing 25 stainless steel balls each ½ inch in diamater, and a ball milling was made for 16 hours at room temperature in nitrogen atmosphere. 39 mg of titanium was contained per gram of the resulting powdered solid.

(b) Polymerization

Using 80 mg of the above powdered solid, polymerization was conducted for 1 hour in the same manner as in Example 1 to yield 12 g. of white polypropylene. Catalyst activity was 23 g. polypropylene/g.solid.hr.$C_3H_6$ pressure, 570 g. polypropylene/g.Ti.hr.$C_3H_6$ pressure. The extraction residue with boiling n-heptane for the total polymer including solvent-soluble polymer was 71%.

Thus, when magnesium oxide was treated with such a halogenating agent as thionyl chloride, the catalyst activity was much lower than that in Example 1.

COMPARATIVE EXAMPLE 5

A solid component was prepared in the same manner as in Example 1, and polymerization was conducted in the same way as in Example 1 except that 0.56 millimol of anisole was used in place of ethyl benzoate, to yield 78 g. of white polypropylene. Catalyst activity was 150 g.polypropylene/g.solid.hr.$C_3H_6$ pressure, 3740 g.polypropylene/g.Ti.hr.$C_3H_6$ pressure. The extraction residue with boiling n-heptane for the total polymer including solvent-soluble polymer was 53%.

COMPARATIVE EXAMPLE 6

A solid component was prepared in the same manner as in Example 1, and polymerization was conducted in the same way as in Example 1 except that 0.56 millimol of diethylphenylphosphine was used in place of ethyl benzoate, to yield 65.6 g. of white polypropylene. Catalyst activity was 126 g.polypropylene/g.solid.hr.$C_3H_6$ pressure, 3150 g.polypropylene/g.Ti.hr.$C_3H_6$ pressure. The extraction residue with boiling n-heptane for the total polymer including solvent-soluble polymer was 56%.

Thus, when such an electron donor as anisole or diethylphenylphosphine was used in place of ethyl benzoate, the amount of boiling n-heptane insoluble component was much smaller than that in Example 1.

We claim:

1. A process for polymerizing or copolymerizing olefins containing from 3 to 8 carbon atoms using a catalyst consisting essentially of:
   (A) a solid component obtained by contacting
       (1) a reaction product resulting from heat reaction of magnesium oxide and an aluminum trihalide at 150° C. to 600° C. with
       (2) a titanium halide and/or an addition product of a titanium halide and an aromatic carboxylic acid ester, and
   (B) an organometallic compound and/or an addition product of an organometallic compound and an aromatic carboxylic acid ester; the total amount of aromatic carboxylic acid ester present in the polymerization system being at least 0.05 mol based on the amount of magnesium (gram-atom) contained in the catalyst system.

2. A process for polymerizing or copolymerizing olefins containing from 3 to 8 carbon atoms using a catalyst consisting essentially of:
   (A) a solid component obtained by contacting
       (1) a reaction product resulting from heat reaction of a magnesium oxide and an aluminum trihalide at 150° C. to 600° C. with
       (2) a titanium halide and/or an addition product of a titanium halide and an aromatic carboxylic acid ester,
   (B) an organometallic compound and/or an addition product of an organometallic compound and an aromatic carboxylic acid ester, and
   (C) an aromatic carboxylic acid ester; the total amount of aromatic carboxylic acid ester present in the polymerization system being at least 0.05 mol based on the amount of magnesium (gram-atom) contained in the catalyst system.

3. A process according to claim 1 or claim 2, in which said solid component is obtained by contacting the component (1) and the component (2) in the presence or absence of an aromatic carboxylic acid ester.

4. A process according to claim 1 or claim 2, in which as the component of [A]-(1) there is used a reaction product obtained by heat-reacting, at a temperature ranging from 150° to 600° C. for a period of time ranging from one minute to ten hours, a magnesium oxide and an aluminum trihalide in respective amounts such that the Al/Mg atomic ratio is in the range of from 0.3 to 5.

5. A process according to claim 1 or claim 2, in which said organometallic compound is either an organoaluminum compound or an organozinc compound.

6. A process according to claim 1 or claim 2, in which the titanium content in the solid component is in the range of from 0.5 to 20% by weight.

7. A process according to claim 1 or claim 2, in which said organometallic compound is used in an amount ranging from 0.1 to 1000 mol per mol of titanium halide.

8. A process according to claim 1 or claim 2, in which said polymerization or copolymerization is carried out in the presence of hydrogen.

9. A process as in claim 1 or claim 2 wherein the temperature at which the heat reaction product is formed is from 200° C. to 500° C.

10. A process as in claim 1, or claim 2 wherein the tempeature at which the heat reaction product is formed is from 250° C. to 400° C.

11. A process according to claim 1 or claim 2 in which the total amount of aromatic carboxylic acid ester present in the polymerization system is from 0.05 to 10 mols based on the amount of magnesium in the catalyst, expressed in gram atoms.

* * * * *